G. W. BONHAM.
Steam-Plow.

No. 34,049. Patented Jan 7, 1862.

UNITED STATES PATENT OFFICE.

G. W. BONHAM, OF HENRY, ILLINOIS.

IMPROVED PULVERIZER AND SEED-SOWER.

Specification forming part of Letters Patent No. 34,049, dated January 7, 1862.

*To all whom it may concern:*

Be it known that I, G. W. BONHAM, of Henry, in the county of Marshall and State of Illinois, have invented a new and useful Improvement in Pulverizers and Seeding-Machines; and I do hereby declare that the following is a full, clear, and exact description of the same, reference being had to the annexed drawings, making a part of this specification, and to the letters of reference marked thereon.

The object of this invention is to sow seed and pulverize the earth; and it consists of a seed-hopper with arrangements for gearing and adjustment, and a series of pulverizers or clod-breakers that are worked by eccentrics or cranks, in combination with vibrating levers and that may be geared and adjusted at the pleasure of the driver of the machine.

To enable others skilled in the art to make and use my invention, I will proceed to describe its construction and operation.

Figure 1:
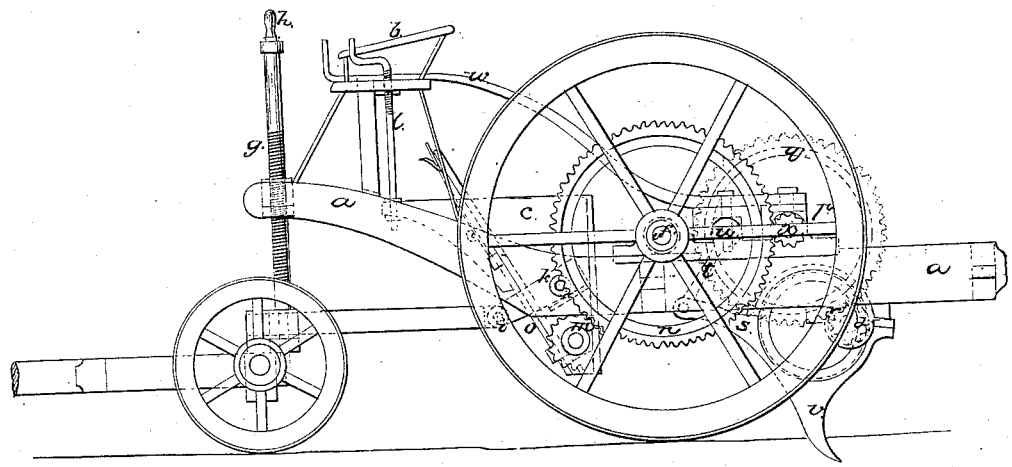
Figure 2:
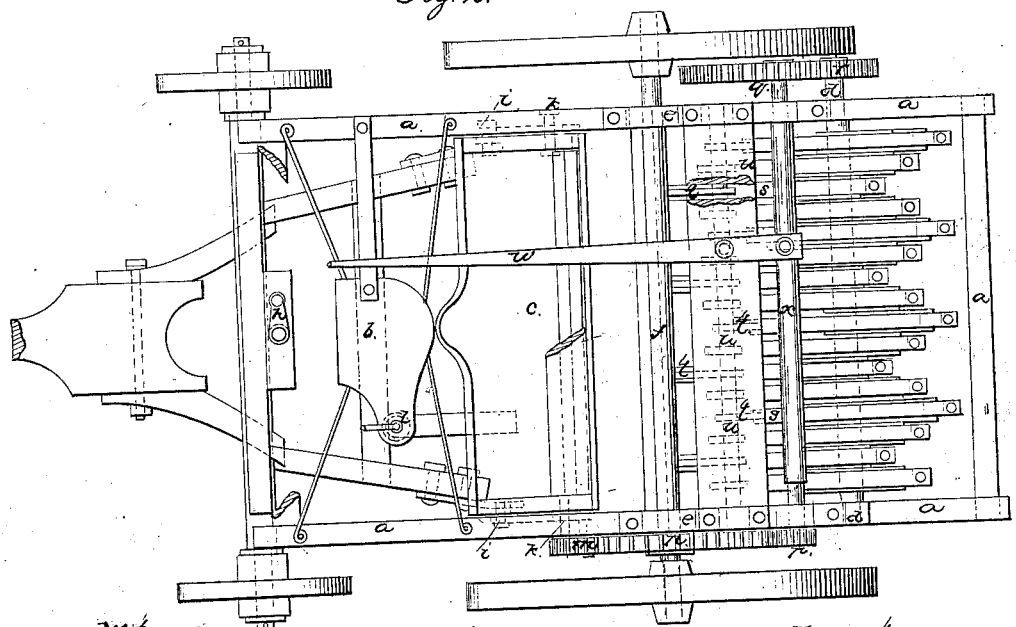

Figure 1 of the drawings is a side elevation of my said machine, and Fig. 2 is a plan of the same.

The frame $a$ carries the driver's seat $b$, the seed-hopper $c$, the shaft $d$ upon which the eccentrics are placed, and the machinery connected with these parts, and it is hung by bearings $e$ $e$, upon the shaft or axle $f$ of the hind wheels of the machine, Fig. 2, so that it may be tilted by the screw $g$, that bears upon and is secured to the truck of the front wheels, by means of the handle $h$, placed in front of the seat of the driver and convenient for his use. The front truck draws the rear one by the bolts $i$.

The seed-hopper $c$ is hung upon journals $k$ in the frame $a$, so that it may be tilted by the screw $l$ placed on the left of the driver, when it is desired to disconnect the seed-hopper, by ungearing the pinion $m$ from the spur-wheel $n$ on the shaft $f$ of the hind wheels. The pinion $m$ is placed on a shaft that has a square section inside the seed-hopper, and extends the whole length of the hopper, so that its angles feed the seed from the hopper as the shaft is revolved.

The quantity of seed passing from the hopper is regulated by the slide $o$, that may be adjusted by a link with a series of holes that hook over a pin, $v$, as is shown in the drawings, or by a screw with a handle under the seat of the driver.

The spur-wheel $n$ on the axle of the hind wheels also gears into the pinion $p$, placed on the same shaft with the spur-wheel $q$, that gears into the pinion $r$ on the shaft $d$, upon which the eccentrics are placed. The ring of each eccentric is made in parts and is bolted together around the eccentric, and the lower half of each ring has an arm, $s$, pivoted to a lever, $t$, vibrating on the shaft $u$, and also a projecting digger or plow, $v$, that is thrust into the ground and withdrawn by the action of the eccentric, and is retained in a vertical position by its connection with the lever $t$. There are sixteen diggers or pulverizers shown in the drawings, that are divided into four sets of diggers or gang-plows, placed at equidistant angles around the shaft $d$, as is shown on the diagram.

The lever $w$ governs the gearing by which the eccentrics are driven by shifting the shaft $x$ and disconnecting the wheels and pinions.

It is manifest that the eccentrics may be replaced with cranks or a cranked shaft for the purpose of operating the pulverizers in the manner described without departing from the spirit of my invention.

When it is desired to operate this machine the rear portion of the frame $a$ is depressed by the screw $g$ and handle $h$ until the pulverizers $v$ enter the ground to the depth desired, and the seed-slide $o$ is set to permit the proper quantity of seed to pass through the opening. As the machine progresses over the ground the rotation of the wheels causes the square shaft in the bottom of the seed-hopper to revolve and feed the seed through the opening, and the rotation of the eccentric shaft through the intermediate gearing from the wheel-axle also alternately depresses and lifts the pulverizers, and breaks and crushes the clogs of earth into small fragments.

The operations of the various parts of the machine can be at any time controlled by the driver without leaving his seat. The forward portion of the frame may be depressed by the screw $g$ to raise the pulverizers from the ground, the seed-slide $o$ may be closed to prevent the dropping of the seed, or the pinion $m$ of the seed-hopper may be ungeared by the screw $l$, and the revolution of the eccentric shaft may be stopped by ungearing it with the lever $w$, thus enabling the machine to be drawn over the ground without operating any of the machinery.

I claim —

1. The pulverizers $v$, arranged on the shaft $d$ in respect to each other, when constructed and operating in the manner and for the purpose specified.

2. Arranging the seed-box $c$ in the frame $a$ on pivots $k$, so that the driver can throw the feeder in and out of gear by the screw $l$, arranged at the side of his seat, as set forth.

3. Attaching the front truck to the front part of the frame $a$, and arranging it in relation thereto, so that the dip of the pulverizers can be regulated by the screw $g$ and handle $h$ in front of the driver's seat, as set forth.

G. W. BONHAM.

Witnesses:
J. H. W. TOOHEY,
CHARLES W. GRAY.